United States Patent [19]

Dygert

[11] 4,091,521

[45] May 30, 1978

[54] ROD SEAL INSTALLATION TOOL

[76] Inventor: Edwin S. Dygert, 5325 W. 74th St., Edina, Minn. 55435

[21] Appl. No.: 805,324

[22] Filed: Jun. 10, 1977

[51] Int. Cl.[2] .......... B23P 11/02

[52] U.S. Cl. .......... 29/451; 29/229; 29/235

[58] Field of Search .......... 277/1; 29/451, 229, 29/235

[56] References Cited

U.S. PATENT DOCUMENTS

| | | | |
|---|---|---|---|
| 1,268,922 | 6/1918 | Bryan | 81/419 |

FOREIGN PATENT DOCUMENTS

| | | | |
|---|---|---|---|
| 2,312,787 | 3/1973 | Germany | 29/235 |
| 804,483 | 11/1958 | United Kingdom | 29/229 |

*Primary Examiner*—James L. Jones, Jr.
*Attorney, Agent, or Firm*—Burd, Braddock & Bartz

[57] ABSTRACT

A resilient ring-shape rod seal is to be installed in a rod seal groove in a cylinder in position to seal against a rod as it moves longitudinally with respect to the cylinder. The inside diameter of the ring-shape rod seal is the same as the nominal outside diameter of the rod. The rod seal installation tool of the invention includes three mutually parallel pins, pivotally mounted with respect to each other and designed to fit down over the ring-shape rod seal to have two outside pins situated inside of the rod seal ring and a center pin situated outside of the rod seal ring. Means are provided to pivot the outside pins out around the center pin and then toward each other to fold the rod seal in a generally C-shape configuration whereby the rod seal and tool can be inserted into the cylinder to align the rod seal with the cylinder rod seal groove. The pins are released to allow the seal to expand toward its nominal ring shape with at least part of the seal in the groove. The tool is withdrawn and the seal is seated in the groove ready to seal onto the outside surface of the rod when the rod is installed in the cylinder.

12 Claims, 6 Drawing Figures

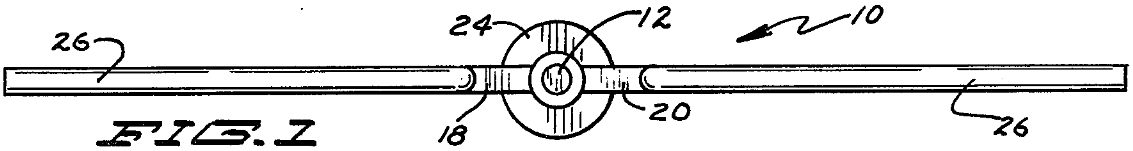
FIG. 1
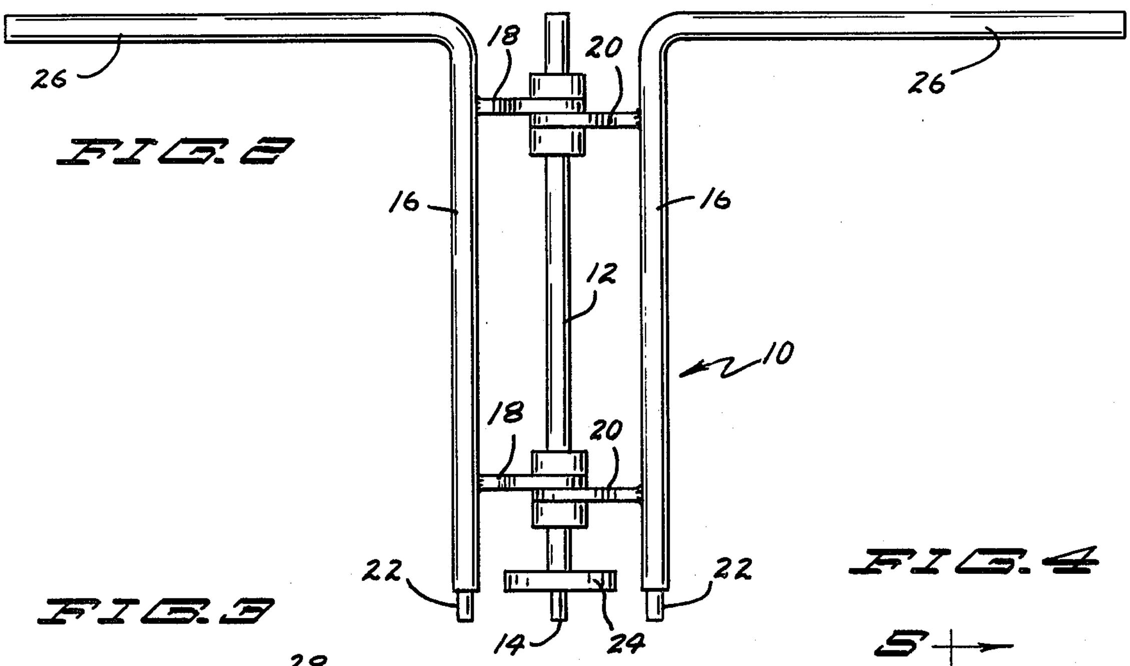
FIG. 2
FIG. 3
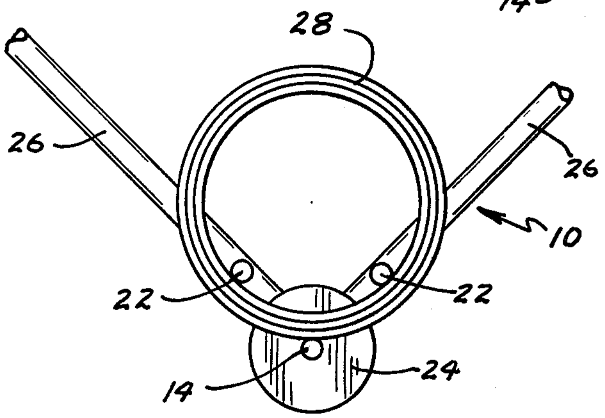
FIG. 4
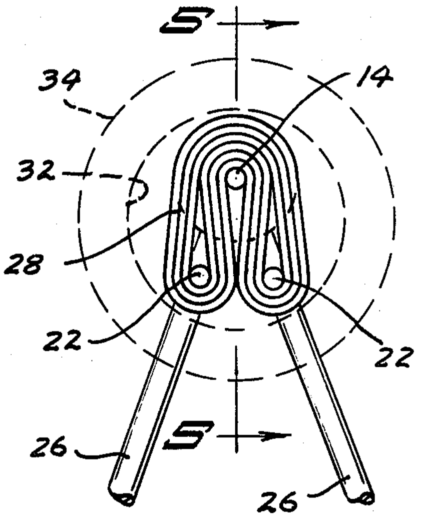
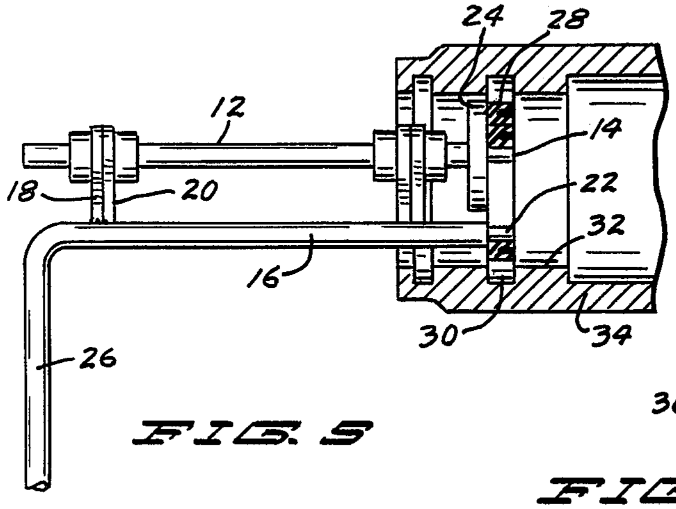
FIG. 5
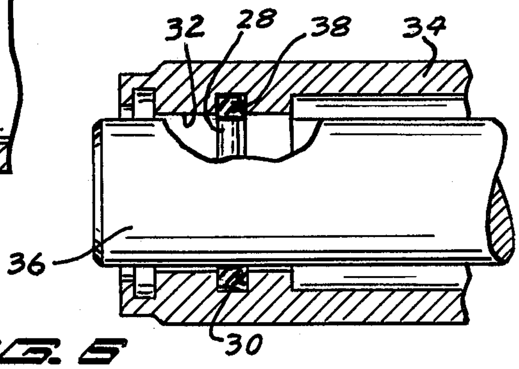
FIG. 6

ROD SEAL INSTALLATION TOOL

BACKGROUND OF THE INVENTION

The inside surfaces of ring-shape rod seals or packings dynamically seal against the outside surfaces of piston rods which are slidably mounted in the throat in the rod ends of cylinders. Thus the inside diameter (ID) of the rod seal is nominally the same as the outside diameter (OD) of the rod. Such a ring-shape packing or seal is generally installed in a fixed groove in the cylinder rod end throat. Therefore, the ring-shape rod seal or packing must be deformed to go into a throat opening approximately the inside diameter of the resilient seal to get it into the fixed groove. This invention has relation to a tool designed to easily form the seal to an assembly position where it will fit freely within a throat opening of that diameter.

Before the present invention, three main methods were used for installing such rod seals:

1. The seals were deformed by hand and picked up with needle nose pliers and installed in the groove.

2. Where the cylinder throat through which a rod seal was to be installed was no less than 2-½ times the cross sectional dimension of the seal, a groove alignment plug was put into the cylinder throat from the one end to terminate in alignment with the near side of the cylinder rod seal groove, the rod seal was inserted from the other end to position at least a portion of the seal in a portion of the rod seal groove, and a tool was pushed down against the seal to try to force it down into alignment in the groove.

3. A plug having the same OD as the cylinder throat was provided with three parallel pins slidably situated therein to be movable longitudinally through the face of such plug. The rod seal to be installed was positioned against the plug face and two of those pins as they extend through the face of the plug, and the operator then attempts to deform the ringshape rod seal into a generally C-shape configuration to bring an exterior portion of the ring into alignment with the opening for the third pin. With the parts cramped in this position, the third pin is pushed forward from the face of the plug to hold the rod seal in its deformed condition. The rod seal, pins and plug are then inserted into the cylinder bore until the operator believes that the rod seal is in approximate alignment with the cylinder rod seal groove, and one of the pins is withdrawn to allow the rod seal to start to snap back into shape. The plug, and hopefully the rod seal now looped over only two pins, is moved back and forth to achieve alignment of the rod seal with the rod seal groove, the remaining pins pulled back through the face of the plug to allow the rod seal to expand into its nominal ring-shape, and the plug removed.

The obvious disadvantage of methods numbered 2 and 3 is that a different plug is required for every different diameter of cylinder throat. Also, the third method requires the use of three hands or some other part of the anatomy to move the third pin into position while the ring seal is being held in its deformed condition.

Use of the tool of the invention can reduce what can take up to ten minutes by manual methods described to no more than thirty seconds.

Furthermore, many U-cup rod seals include an internal expander, this being a further ring-shape member situated inside of the U-cup shape of the outer member. When employing hand assembly, described above, this expander ring often pops loose and must be carefully and laboriously reinstalled before attempting to again force the rod seal into the cylinder rod seal groove.

SUMMARY OF THE INVENTION

A rod seal installation tool consists of three mutually parallel pins pivotally mounted with respect to each other. In the form of the invention as shown, two outside pins are pivoted with respect to the longitudinal axis of a center pin, and means are provided for pivoting those pins to cause them to move around the center pin and then toward each other. The pins are initially situated with respect to a resilient ringshape rod seal to be installed in a cylinder rod seal groove on the interior of a cylinder rod end throat such that the two outside pins are inside of the rod seal ring, and the center pin is outside thereof. A disc-shape stop plate or washer is situated in concentric relationship to the center pin and extends outwardly therefrom to prevent the rod seal as it is being deformed from leaving its primary plane.

As the two outside pins pivot around the center pin they move the rod seal into a generally C-shape configuration having an outside dimension such that it and the pins on the tool can be inserted into the throat of the cylinder to bring the rod seal into alignment with the cylinder rod seal groove. The means for pivoting the pins can then be relaxed slightly to allow the rod seal ring expand sufficiently so that the operator can drag the expanding seal ring along the throat until a portion of the rod seal ring is in its groove. The outside pins can then be pivoted to release the rod seal ring and allow it to regain its ring shape, and the tool can then be removed. The remaining installation, if needed, to firmly place the rod seal ring into its groove, can be accomplished using the end of the tool, another tool, or the fingers of the operator.

The rod can then be installed in the cylinder throat in sealing relation and to the rod seal and can then be used with its cylinder for its intended purpose.

IN THE DRAWINGS

FIG. 1 is a top plan view of the tool of the invention showing shanks associated with outside pins at their maximum distance from the shank associated with a center pin;

FIG. 2 is a front elevational view of the tool of FIG. 1;

FIG. 3 is a bottom plan view of the tool of the invention associated with a resilient ring-shape rod seal before deformation of that seal;

FIG. 4 is a bottom view of the tool and rod seal of FIG. 3 after the rod seal has been deformed and showing in phantom the cylinder rod end throat into which the rod seal is to be installed;

FIG. 5 is a vertical sectional view taken on the line 5—5 in FIG. 4 and showing the relationship of the tool and the deformed rod seal to the cylinder rod end throat and cylinder rod seal groove just before the rod seal is allowed to regain its ring-shaped configuration;

FIG. 6 is a vertical sectional view of the rod seal installed in the cylinder throat of FIG. 5 but also showing a rod installed in the cylinder throat in sealing relation to the rod seal.

DESCRIPTION OF PREFERRED EMBODIMENT

A rod seal installation tool 10 includes a center shank 12 with a center pin 14 in longitudinal alignment with it and extending below it. A pair of outside shanks 16,16 are parallel to, spaced from and pivotally mounted with respect to the center shank 12 by shank pivot arms 18,18 and 20,20. Outside pins 22,22 are in longitudinal alignment with the shanks 16,16 and extend downwardly therefrom as best seen in FIG. 2.

As shown, the three pins are all of smaller diameter than their associated shanks, and a large diameter disc-shape stop plate or washer 24 is fixedly positioned on the center shank 12 just above the upper end of center pin 14.

Outside installation tool operating handles 26,26 extend integrally outwardly away from top ends of each of the outside shanks 16,16 at right angles thereto.

The rod seal installation tool 10 is for the purpose of installing a resilient ring-shape rod seal such as the one illustrated at 28 into a rod seal groove such as the groove 30 in the throat 32 of the rod end of a cylinder 34 in order to be in position to come into sealing relationship with respect to a rod 36, all as illustrated in FIGS. 5 and 6.

The rod seal installation tool 10 of the invention will be effective to install resilient rod seal rings of many configurations. As illustrated herein, however, the resilient ring-shape rod seal 28 is of a generally U-cup shape in cross section and has an internal expander ring 38 filling the U-cup groove.

OPERATION

To prepare resilient ring-shape rod seal 28 to be fitted into cylinder throat 32 which has substantially the same inner diameter as the inner diameter of the rod seal 28, the seal 28 can first be rested on a substantial horizontal flat surface. As best seen in FIG. 3, consider that the ring-shape rod seal 28 is resting on a horizontal pane of glass or other transparent substrate, consider that FIG. 3 is a bottom view of that rod seal 28, and consider that the rod seal installation tool 10 is positioned down on top of the seal 28 to have the outside pins 22,22 inside of the ring of the rod seal 28 and the center pin 14 outside of that ring, with the three pins resting on the transparent substrate. Holding the pins down against the substrate, so that the rod seal cannot come out of its generally horizontal plane, the tool operating handles 26,26 are moved from the position as seen in FIG. 3 to the position as seen in FIG. 4, thus forceably arranging the rod seal 28 in the generally C-shape configuration shown in FIG. 4. How this relates to the throat 32 of the cylinder 34 is illustrated in dotted lines in FIG. 4.

With the rod seal 28 in this configuration and held by the pins 22,22 and 14 of the tool 10, the tool and the rod seal are inserted inside of the cylinder throat 32 to position the rod seal in general alignment with the rod seal groove 30 in that cylinder bore, as seen in FIG. 5. The handles 26 will be rotated somewhat upwardly from the position as seen in FIG. 4 to allow the rod seal 28 to begin to expand, and the tool 10 can be moved in and out along the cylinder bore until the operator feels the rod seal 28 in contact and in alignment with the rod seal groove 30. At this point, the operating handles 26,26 can be rotated upwardly from somewhat near the position as seen in FIG. 4 to the approximate position as seen in FIG. 3, and, at the same time, the tool can be withdrawn from the cylinder throat, leaving the resilient ring-shape rod seal 28 to resume its ring-like configuration. It is to be expected that, in some cases, the rod seal 28 will not move automatically into rod seal groove 30 around its entire periphery, and the operator can use his hand or another instrument or even part of the installation tool 10 to force the rod seal 28 completely into the rod seal groove 30.

The piston rod or the like 36 can then be inserted into the throat 32 of the cylinder 34 so that it is in sealing relationship with respect to the rod seal 28, and the installation is complete.

The embodiments of the invention in which an exclusive property or privilege is claimed are defined as follows:

1. A tool for installing a deformable, resilient ring through an opening in a machine having a substantially lesser inside dimension than the outside dimension of the ring to be installed, said tool including:
   - A. a center pin;
   - B. a pair of outside pins in spaced apart, parallel alignment with the center pin;
   - C. each of the pins having a longitudinal dimension of at least the thickness of the ring to be installed;
   - D. means for pivoting the outside pins around the center pin while maintaining the parallel alignment with the center pin;
   - E. the distance between the longitudinal axes of the outside pins and the longitudinal axis of the center pin being such that when the outside pins are moved adjacent each other with the outside pins inside the resilient ring and the center pin outside the resilient ring, the resulting deformed ring and the pins will fit into and through said machine opening.
2. The tool of claim 1; and
   - F. means for preventing the resilient ring from moving out of the nominal plane of the ring.
3. The tool of claim 2;
   - G. wherein: said means for preventing movement of the ring out of its nominal plane includes a flat stop plate mounted on and concentric with said center pin.
4. The tool of claim 3;
   - H. A shank extending upwardly from and in longitudinal alignment with each of said outside pins and from said center pin; and
   - I. wherein said means for pivoting said outside pins around said center pin includes said shanks and pivot arms pivotally connecting each of said outside shanks to said center shank.
5. The tool of claim 4; and
   - J. a pair of tool operating handles, one extending outwardly from each of the outside shanks.
6. A method of installing a deformable, resilient ring through a machine opening having a substantially lesser inside dimension than the outside dimension of the ring to be installed, including the steps of:
   - A. situating the resilient ring on a flat plane substrate;
   - B. placing a pair of outside pins inside the ring and a center pin outside the ring all to be in contact with the substrate;
   - C. pivoting outside pins about the center pin while maintaining parallel alignment therebetween, and toward each other to force the ring into a C-shape configuration while retaining the ring in a plane parallel to the plane of the substrate;
   - D. lifting the pins and the ring from the substrate and inserting them in the machine opening;
   - E. permitting the outside pins to move back around the center pin, and due to its resilience, allowing the ring to tend to resume its nominal shape; and
   - F. removing the pins from the machine opening.

7. A tool for installing a deformable, resilient ring-shape rod seal through a cylinder rod end throat opening and into a rod seal groove provided in that cylinder throat, said throat opening having an inside dimension substantially nominally the same as the inner dimension of the rod seal to be installed, said tool including:

A. a center pin;

B. a pair of outside pins in spaced apart, parallel alignment with the center pin;

C. each of the pins having a longitudinal dimension of at least the thickness of the ring to be installed;

D. means for pivoting the outside pins around the center pin while maintaining the parallel alignment with the center pin;

E. the distance between the longitudinal axes of the outside pins and the longitudinal axis of the center pin being such that when the outside pins are moved adjacent each other with the outside pins inside the rod seal and the center pin outside the rod seal, the resulting deformed rod seal and pins will fit into the throat opening.

8. The tool of claim 7; and

F. means for preventing the rod seal from moving out of its nominal plane, said means including a flat stop plate mounted on and concentric with said center pin.

9. The tool of claim 8;

G. a shank extending upwardly from and in longitudinal alignment with each of said outside pins and from said center pin; and H. wherein said means for pivoting said outside pins around said center pin includes said shanks and pivot arms pivotally connecting each of said outside shanks to said center shank.

10. The tool of claim 9; and

I. a pair of tool operating handles, one extending outwardly from and in substantially normal relation to each of the outside shanks.

11. A method of installing a deformable, resilient, normally ring-shape rod seal through a cylinder rod end throat and into a rod seal groove provided in that throat, said throat opening having an inside dimension substantially nominally the same as the inside dimension of the rod seal to be installed, including the steps of:

A. situating the resilient ring-shape rod seal on a flat plane substrate;

B. placing a pair of outside pins inside the ring-shape rod seal and a center pin outside the rod seal, all to be in contact with the substrate;

C. pivoting the outside pins about the center pin while maintaining parallel alignment therebetween and toward each other to force the rod seal into a C-shape configuration while retaining the ring in a plane parallel to the plane of the substrate;

D. lifting the pins and the rod seal from the substrate and inserting them into the cylinder throat to be in approximate alignment with the rod seal groove;

E. permitting the outside pins to move back around the center pin, and, due to its resilience, allowing the rod seal to begin to resume its ring-shape form sufficiently to permit it to contact the throat;

F. manipulating the pins and consequently the rod seal longitudinally along the cylinder throat to reach or confirm alignment of the rod seal with at least a portion of the rod seal groove; and G. allowing the rod seal to regain its ring-like shape by further moving the outside pins away from each other and withdrawing all the pins from the throat.

12. The method of claim 11; and

H. the final step of completing installation of the rod seal in the rod seal groove by physically forcing the seal into the groove to fully restore its ring shape.

* * * * *